No. 806,457. PATENTED DEC. 5, 1905.
H. C. BOWLUS.
AUTOMATIC WEIGHING MACHINE.
APPLICATION FILED MAY 28, 1904.
3 SHEETS—SHEET 3.
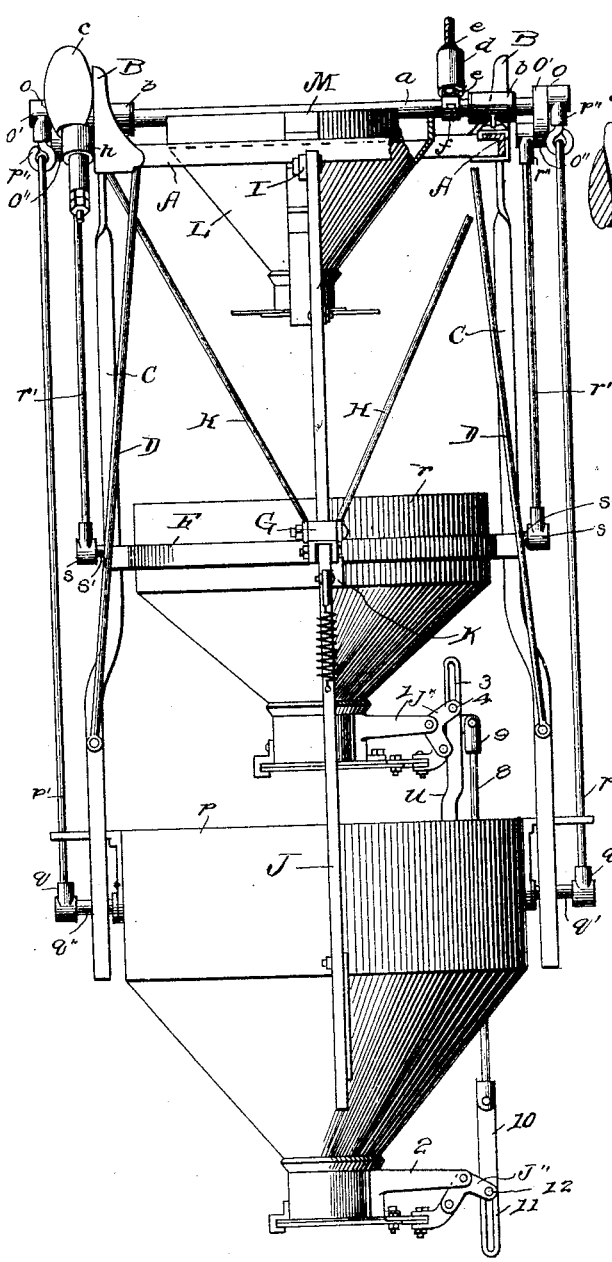
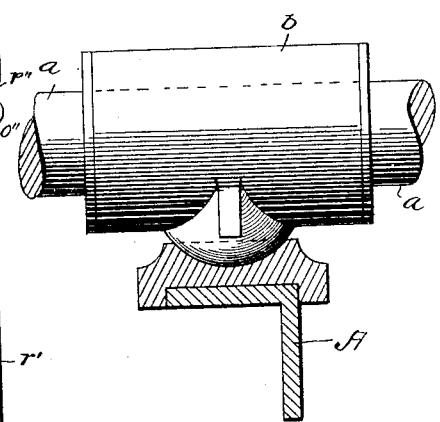
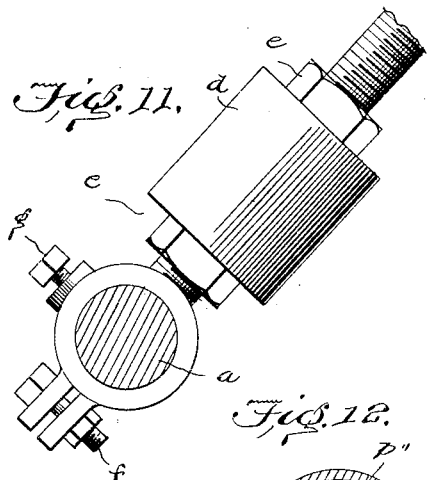
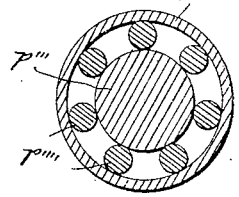
Witnesses
G. Howard Walmsley.
Gertrude D. Young.
Inventor
Henry C. Bowlus,
By H. A. Toulmin.
Attorney

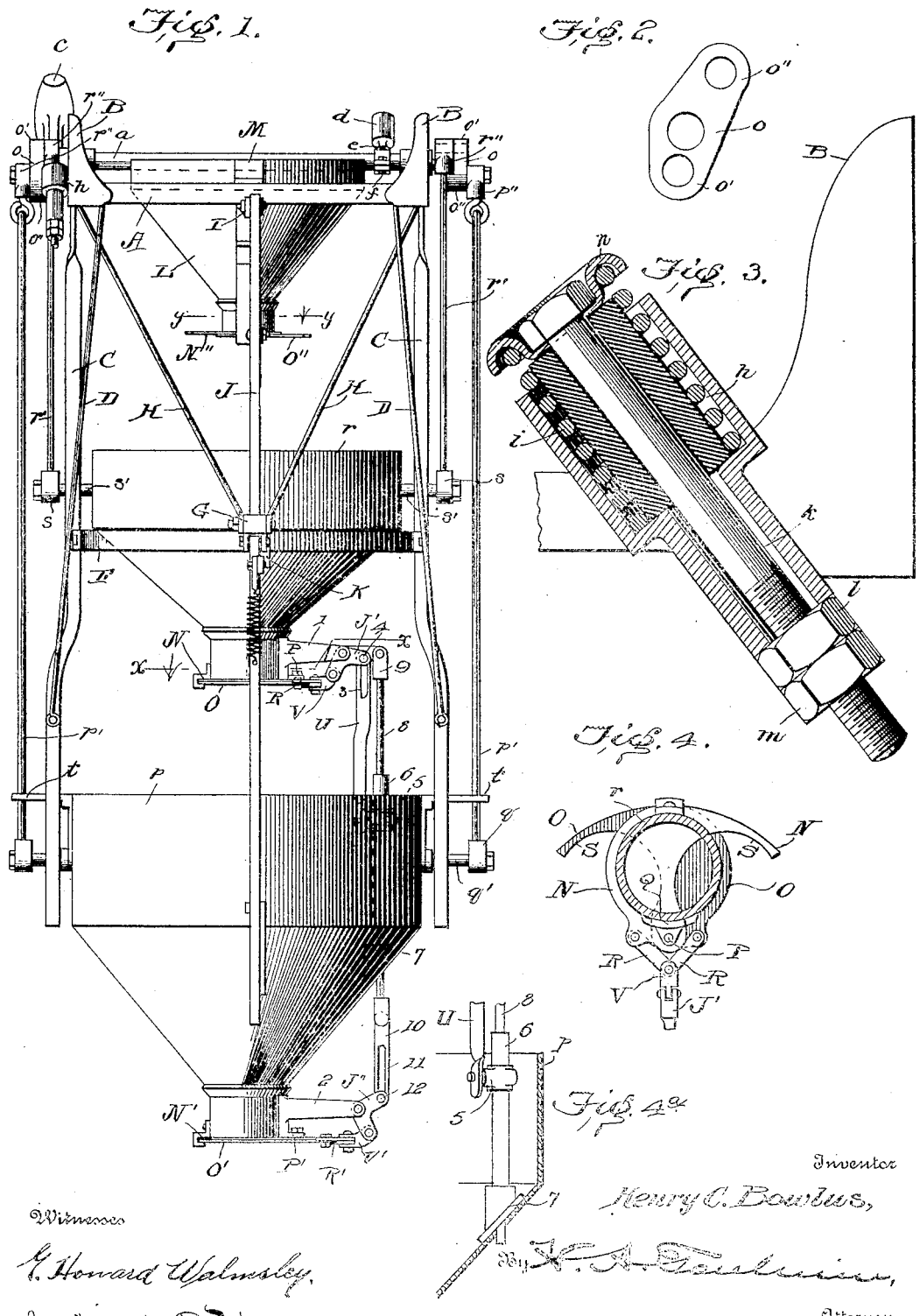

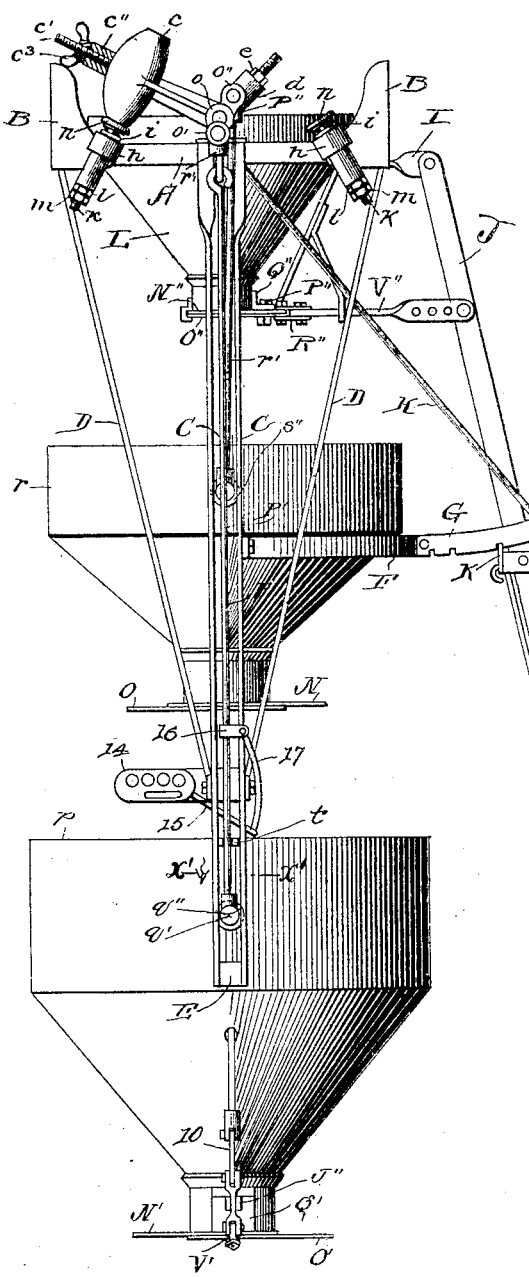

UNITED STATES PATENT OFFICE.

HENRY C. BOWLUS, OF SPRINGFIELD, OHIO, ASSIGNOR TO THE BOWLUS AUTOMATIC SCALE COMPANY, OF SPRINGFIELD, OHIO, A CORPORATION OF OHIO.

AUTOMATIC WEIGHING-MACHINE.

No. 806,457.     Specification of Letters Patent.     Patented Dec. 5, 1905.

Application filed May 28, 1904. Serial No. 210,150.

*To all whom it may concern:*

Be it known that I, HENRY C. BOWLUS, a citizen of the United States, residing at Springfield, in the county of Clark and State of Ohio, have invented certain new and useful Improvements in Automatic Weighing-Machines, of which the following is a specification, reference being had therein to the accompanying drawings.

This invention relates to improvements in automatic weighing-machines, and is specially designed for weighing grain and the like as it is discharged in a continuous stream or flow from any suitable source of supply, as a grain-elevator; but is capable of other applications of use.

The present invention is designed, in a general sense, as an improvement upon the machine embodied in Letters Patent of the United States, issued to me November 4, 1902, numbered 712,757, for automatic weighing-machines.

The invention consists in certain novel features which will be hereinafter described and then particularly pointed out in the claims.

In the accompanying drawings, forming a part of this specification, and on which like reference characters indicate corresponding parts, Figure 1 is a front elevation of my weighing-machine, showing it ready to receive grain; Fig. 2, a detail side view of the bell-crank arm; Fig. 3, an enlarged detail longitudinal sectional view of one of the bumpers; Fig. 4, a detail sectional and plan view on the line $y\,y$ of Fig. 1 looking downward and showing the receiving-hopper and weighing-hopper discharge and cut-off; Fig. 4$^a$, a detail sectional view through a part of the weighing-hopper, showing the mounting and connection of certain parts; Fig. 5, a side elevation of the machine, with the parts in the same position that they occupy in Fig. 1; Fig. 6, a detail sectional and plan view on the line $x\,x$ of Fig. 5 looking downward and showing the feeding-hopper discharge and cut-off; Fig. 7, a vertical sectional view of the weighing-hopper, illustrating the interior scale for determining the weight of the contained grain; Fig. 8, a horizontal sectional view on the line $x'\,x'$ of Fig. 5, showing particularly a part of the frame, with the hopper-trunnion or shaft and its guiding-roller; Fig. 9, a similar or like front elevation to that shown in Fig. 1, except that the parts are in the position occupied when the weighing-hopper has just about received the quantity of grain which the machine has been built or set to weigh; Fig. 10, a partial sectional view and side elevation of the self-alining bearing for the rock-shaft; Fig. 11, a partial sectional view and elevation of the rock-shaft and counterpoise-weight, and Fig. 12 a detail view showing the roller-bearing between the crank and supporting-rods.

The letter A designates the side bars of the frame, of which bars there are four, preferably L-shaped in cross-section, connected by four corner pieces or castings B. To the bars A are secured pairs of uprights C, upon opposite sides of the frame, which uprights are braced to the frame by brace-rods D. The lower ends of the uprights, which constitute the respective pairs, are preferably united by a block or filling E, to keep their lower ends from separating. To these uprights C there is connected a half-circular frame-piece F, which adds rigidity to the general frame and which has an extension G, to which other brace-rods H are attached. Thus a general frame or skeleton is provided. An ear I, projecting from the upper part of the frame, carries a hand-lever J, having a spring-detent K to engage with one or the other of several notches in the extension or segment G. This lever J is used to open and close the cut-off of the feeding-hopper L, which is secured to the side bars A, as more clearly seen in Figs. 1 and 9, by clips or brackets M.

The cut-off of the receiving-hopper $r$ is composed of two plates N and O, pivoted at P on a pivot carried by a bracket Q, extending from the lower part of the hopper. The toggle-bars R are operated by the bell-crank lever J' and the link U and link V, connecting the toggle-bars to the bell-crank lever. The plates are placed one above the other, as seen in Fig. 1, and overlap each other, as seen in Fig. 4. When these plates stand one above the other or overlap, they close the discharge-opening of the hopper. They are shown in this position in Fig. 4, the plate N being on top and the plate O beneath, as indicated by the dotted lines; but when the toggle-bars R are drawn outward they swing the plates on the pivot P, the plate N moving to the left and the plate O to the right, causing the curved or crescent edges S of the two plates to pass each other and then recede farther and farther apart, thus opening the discharge-opening of the hopper. The action of the toggle-bars is controlled and timed, as will appear when reference is made to the operation of the machine. The construction and operation just described apply also to the cut-off or closure for the weighing-hopper $p$, in which the cut-off plates are designated $N'$ and $O'$, the pivot $P'$, and the toggle-bars $R'$, the link $V'$, and the bell-crank lever $J''$. Referring now to the cut-off for the feeding-hopper L, (see Fig. 6, wherein the same character of plates, designated $N''$ and $O''$, are pivoted on a pivot $P''$, carried by a bracket $Q''$, and are operated by toggle-bars $R''$, themselves actuated by a link $V''$, connected to the hand-lever J, before referred to,) the only difference between the cut-off for the feeding-hopper L and the cut-offs for the receiving-hopper $r$ and weighing-hopper $p$ is that in the first-named the relation of the pivot $P''$ to the point of connection $U''$ of the toggle-bars to the plates constitutes levers of the first order of the plates, while in the second-named cut-offs the relation of the pivots P and $P'$ to the pivotal connection of the toggle-bars to the plates constitutes levers of the second order of the plates, since the weight is between the power (the pivotal connection of the links R to the plates, Fig. 4) and the fulcrum, (the point P.) When the lever J is shifted in or out, the plates $N''$ and $O''$ will be opened or closed, more or less, according to the position to which the lever J is adjusted.

A rock-shaft $a$ is mounted in bearings $b$, carried by the frame A B. This shaft carries a poise or weight $c$ near one end and a counterpoise $d$ near the other end, the arms of the weight or poise $c$ and of the counterpoise $d$ being set at an angle to each other, say a right angle. By adjusting the counterpoise-weight the parts of the mechanism may be properly counterbalanced, so as to cause the poise or weight $c$ to correctly weigh the grain or other material. Jam-nuts $e$ on the counterpoise-arm hold the counterpoise $d$ against moving from any adjusted position, as clearly indicated in Fig. 11. Besides the clamping action of the screw $f$ in maintaining the counterpoise-arm on the rock-shaft $a$, a set-screw $g$ may also be employed. Any suitable means may be also used for securing the arm of the poise or weight $c$ to this shaft. The poise $c$ is provided with a short stud-shaft $c'$, carrying a supplementary poise or weight $c''$, held in place by a thumb-nut $c^3$. This supplementary weight or poise $c''$ is for use with different grains. For instance, if the machine is balanced or built for, say, oats, and then wheat or corn is to be weighed, a supplemental weight $c''$ would be applied of one heft for wheat and of lighter heft for corn. Thus by the use of several different supplemental weights the balancing of the machine need not be disturbed after it is once effected by the proper adjustment of the counterpoise $d$. The poise $c$ will be of weight for a machine to weigh two hundred pounds or two hundred and fifty pounds or any less or greater weight, according to the class or grade of the machine.

A bumper is placed one at either side of the frame to receive the impact of the weight or poise $c$ and to yield thereto to prevent shock to the machine. This bumper is constructed of a sleeve $h$, suitably secured to the frame, with a spiral spring $i$ therein, as also a rubber cushion $j$, in which latter is arranged a bolt or stem $k$, having an adjusting-nut $l$ and a jam or locking nut $m$ near one end and carrying at the other a cap $n$, turned over at the edge to receive the upper end of the spiral spring. The presence of the rubber cushion $j$ besides assisting to take up the shock also prevents rattling of the parts, while the spring $i$ principally sustains the shock.

Referring again to the rock-shaft $a$, it will be seen that it carries at either end a bell-crank $o$, having a short arm $o'$ and a longer arm $o''$. From the shorter arms of these bell-cranks the heavier and larger hopper—namely, the weighing-hopper $p$—is supported by the rods $p'$, connected to said crank-arms $o'$ by a bearing $p''$ and connected to the hopper by a knife-edge bearing $q$, mounted on a stud $q'$, projecting from the hopper, the stud $q'$ being guided by passing between the bars C and having an antifriction-roller $q''$. In this way the hopper is suspended and guided in its movements up and down. Then by the longer arms $o''$ of these bell-cranks is supported the receiving-hopper $r$ by means of rods $r'$, secured to such arms by bearings $r''$, the rods $r'$ being also attached to knife-edge bearings $s$ on stud-shafts $s'$, projecting from the hopper $r$. Thus the receiving-hopper is supported. These stud-shafts $s'$ also have antifriction-rollers $s''$, which travel between the bars C.

It will now be seen that while the feeding-hopper L is stationarily supported in the general frame the receiving-hopper $r$ and the weighing-hopper $p$ are suspended from the rock-shaft $a$ by the bell-cranks $o$ and the intermediate connections described with the result that when the receiving-hopper descends the weighing-hopper ascends, and vice versa, as will be more fully explained in stating the operation of this machine. It may be added here that brackets $t$, extending from the weighing-hopper, contact with the rods $p'$ in a manner to prevent the hopper from tipping on the stud-shafts $q'$, a desirable feature in cases where the grain accidentally accumulates more on one side of the weighing-hopper than on the other, as sometimes happens.

Referring now to the means for opening and closing the cut-offs of the receiving and weighing hoppers, it will be seen that the bracket 1 on the receiving-hopper carries the bell-crank J', while the bracket 2 on the weighing-hopper carries the bell-crank J''. The link U is slotted at 3 to fit over the pin 4 of the bell-crank lever J' and is connected to an arm 5, secured to a tubular column 6, attached to the weighing-hopper $p$ at the point 7, as shown in dotted lines in Fig. 1. Through this column 6 extends a rod 8, secured at the point 9 to a part of the bracket 1 and having a link 10 at its other end, slotted at 11, so as to fit over the pin 12 of the bell-crank lever J''. Thus when the receiving-hopper receives grain enough to cause it to descend and carry with it the bell-crank lever J' the pin 4 will engage with the lower end of the slot 3, causing the bell-crank lever J' to turn on its pivot and pull on the cut-off plates so as to open the discharge end of the receiving-hopper, while at the same time the weighing-hopper $p$ will have started to ascend and to bring the pin 12 of the bell-crank J'' into contact with the upper end of the slot 11, so as to operate the lever and close the cut-off plates of this hopper. The provision of the hollow column 6 permits of the passage of the rod 8 through the weighing-hopper, yet without liability of leakage of the grain. Again, it will be seen that when the receiving-hopper and the weighing-hopper separate by the ascent of the former and the descent of the latter the pin 4 of the bell-crank lever J' will engage with the upper end of the slot 3, and thus close the cut-off, while the pin 12 of the bell-crank lever J'' will engage with the lower end of the slot 11, and thus open the cut-off of the weighing-hopper. Referring to Fig. 7, it will be seen that at 13 is shown a scale on the interior of this hopper with figures designating pounds. The purpose of this scale is to show the weight of so much grain as may be left over from any given quantity, when the amount so left over is less than the quantity to weigh which at each operation the machine has been set. Thus by this scale 13 the irregular quantities left over from each general weighing may be determined, since, for instance, if the quantity left over were to fill the weighing-hopper to the figure "125" it would mean that there were one hundred and twenty-five pounds in this quantity, while the machine might have been built and set to weigh in quantities of two hundred pounds.

As a means of determining how often the machine goes through a cycle of operations and how many times it weighs the particular number of pounds for which it was set I provide a register, as shown at 14, the register to be of any ordinary type now on the market and having its actuating-lever 15 attached to one of the rods $p'$ by means of a clamp 16 and a connecting-link 17. The register is connected to the frame-bars C and is stationary, while the movement imparted to its lever 15 in the manner stated will cause the register to record the number of times the weigher weighs. Thus by multiplying the total number of times the machine has weighed by the number of pounds it was set to weigh each time it can be determined at once how many pounds have been weighed after any given time.

The operation of the apparatus is as follows: The parts being in the position shown in Fig. 1, the material to be weighed is discharged in a continuous stream from the source of supply into the feeding-hopper L, which guides it centrally into the receiving-hopper $r$, where it accumulates until its weight is sufficient to overcome the resistance of the poise $c$ with or without the supplemental poise $c''$, as the case may be. The cut-off of the feeding-hopper was first opened by the lever J and intermediate connections, while the cut-off of the receiving-hopper $r$ is at this time closed. When sufficient grain has accumulated in the receiving-hopper $r$, the hopper moves downward, throwing the poise $c$ (and $c''$ in some cases) upward until it passes the vertical, whereupon it falls by gravity over to the other abutment. During this downward movement of the hopper $r$ the corresponding upward movement of the weighing-hopper $p$ takes place. The first result of this movement of the hoppers, so far as the operation of the cut-offs is concerned, is that the cut-off of the receiving-hopper is opened just after the cut-off of the weighing-hopper is closed, so that the grain passes from the receiving-hopper into the weighing-hopper, and the parts have changed from the position shown in Fig. 1 to that shown in Fig. 9. The relative arrangement of the slots 3 and 11 is such as to effect the closing of the cut-off of the weighing-hopper just before the cut-off of the receiving-hopper is opened. It may also be stated at this point that the ends of the slot 3 and the ends of the slot 11 are in such position as to be out of contact with the respective pins 4 and 12 when the weighing takes place, so that the receiving-hopper and the weighing-hopper are not at all interconnected in a way to obstruct their initial movements, their adjustment being delicate and they being required to actuate without hindrance when they respectively receive the proper quantity of grain. The grain in the receiving-hopper then passes into and is retained in the weighing-hopper, the flow from the feeding-hopper meanwhile continuing into and through the receiving-hopper, and when the weighing-hopper has received approximately enough grain to equal in weight the pounds which the machine has been built and set to weigh then the weighing-hopper descends back to the position shown in Fig. 1. In doing so it closes the cut-off of the receiving-hopper and then immediately opens its own cut-off. The grain that continues to flow into the weighing-hopper from the time it starts downward until it closes the cut-off of the receiving-hopper added to the grain contained in the weighing-hopper when it first starts down makes the exact quantity the machine is set to weigh. In other words, the weighing-hopper starts down just before that quantity of grain has accumulated in it, and the remaining amount falls into it in the brief interval, pending which the cut-off of the receiving-hopper is closed. While the weighing-hopper is discharging the receiving-hopper is receiving another supply. In this way the operation is made continuous. The machine is accurate and effective, as I have ascertained from practical use of it in the course of its manufacture and sale. Of course it will be understood that when the weighing-hopper descends the receiving-hopper ascends and the poise or weight $c$ travels back to the side of the machine from which to start. The organization of three hoppers in the machine enables me to operate the machine continuously, the feeding-hopper being refilled while the weighing-hopper is weighing its contents. This arrangement also enables me to cut off the supply by closing the feeding-hopper even while the other hoppers are doing their work.

These machines are built to respectively weigh a minimum weight and are properly poised and balanced by adjusting the counterpoise $d$, so that when so poised or balanced they will weigh the minimum weight for which they have been built and so set. Then to weigh weights in excess of this minimum resort is had to the supplemental weights $c''$, they being furnished in sets and duly marked, so that if, say, one hundred additional pounds are to be weighed the proper supplemental weight therefor will be applied.

Referring again to the connection of the rods $p'$ to the crank $o$, it will be seen from Fig. 12 that the bearing $p''$ is mounted on a stud $p'''$ with rollers $p''''$ interposed to reduce friction. The same construction is also employed in connecting the rods $r'$ to the said crank $o$.

Having thus fully described my invention, what I claim as new, and desire to secure by Letters Patent, is—

1. In an automatic weighing-machine, the combination, with a receiving and a weighing hopper, a cut-off for each of said hoppers composed of pivoted plates adapted to stand across the discharge-opening of the hopper and to swing away from the opening, and devices to actuate said plates to close and open them, a rock-shaft, crank-arms carried thereby, means connecting one set of crank-arms with one of the hoppers and the other set of crank-arms with the hopper, the cranks and connections being such that when the shaft rocks, said hoppers approach or recede from each other, while the devices which actuate the plates so act when the hoppers approach and recede.

2. In an automatic weighing-machine, the combination, with a receiving-hopper and a weighing-hopper, a cut-off for each hopper composed of pivoted plates standing crosswise the openings of the hoppers, the plates being adapted to swing horizontally on their pivots so as to open and close the openings, actuating devices for the receiving-hopper plates connected to the weighing-hopper, and actuating devices for the weighing-hopper plates connected to the receiving-hopper, so that when said hoppers approach and recede from each other the plates are operated as desired, and means by which the hoppers are mounted to permit of their approaching and receding to and from each other.

3. In an automatic weighing-machine, the combination, with a receiving and a weighing hopper, each having a discharge-opening, of a bracket carried by each hopper, overlapping cut-off plates pivoted to each bracket and adapted to swing in a horizontal plane, a bell-crank connected to each bracket and respectively to the respective cut-off plates, a slotted rod secured to the weighing-hopper and engaging with the bell-crank of the receiving-hopper, and another slotted rod secured to the receiving-hopper and engaging with the bell-crank of the weighing-hopper.

4. In a automatic weighing-machine, the combination, with a hopper having an opening, and a pair of horizontal plates adapted to overlap each other, the upper plate being fitted to the hopper and the under plate being fitted to the upper plate, so that in one position the plates open the hopper and in the other positively close it against the leakage of grain, there being a common vertical pivot for the plates, of toggle-links connected to the plates, and means to operate the toggle-links.

5. In an automatic weighing-machine, the combination with a general frame, of pairs of bars or tracks secured thereto and depending therefrom, and receiving and weighing hoppers located between said respective pairs of bars or tracks, and having stud-shafts which project between the individual bars or tracks of each pair and are guided thereby.

6. In an automatic weighing-machine, the combination, with a weighing-hopper pivotally mounted and suspended by supporting-rods, and having projecting fingers which engage with said rods to one side of the pivotal support, to prevent the hopper from tipping on said pivotal supports as their centers.

7. In an automatic weighing-machine, a bumper composed of a sleeve, a bolt mounted therein, a cap on the bolt near one end, a retaining-nut near the other, a cushion and a spiral spring encircling the bolt and mounted within the sleeve, and a movable poise arranged to strike said bumper which acts to arrest the poise and take up its shock.

8. In an automatic weighing-machine, the combination, with a receiving-hopper and a weighing-hopper, and a hollow column secured thereto and extending therethrough, of a rod extending through said column and another rod secured to said column, said rods constituting actuating devices and cut-offs for the hoppers connected to said actuating devices.

9. In an automatic weighing-machine, the combination, with a receiving-hopper and a weighing-hopper, and means by which they are mounted so as to automatically approach and recede from each other, horizontal cut-off plates pivoted to the respective hoppers, bell-cranks carried by the respective hoppers to operate the respective sets of plates, a hollow column attached to and extending through the weighing-hopper, a slotted rod secured to the column and acting to operate the bell-crank of the receiving-hopper, and another slotted rod extending through the column and adapted to operate the bell-crank of the weighing-hopper and attached to the receiving-hopper, the slots of the respective rods extending beyond the pins or points of connection in the bell-cranks when the hoppers are in the relative position which takes place when the weighing is effected, whereby there is no positive connection between the hopper cut-offs when the weighing takes place.

10. In an automatic weighing-machine, the combination, of a feeding-hopper having a cut-off for its discharge end, a receiving-hopper, and a weighing-hopper, each having cut-offs for their discharge-openings, devices for opening the cut-off of the feeding-hopper and closing the cut-off of the weighing-hopper and vice versa when said hoppers approach toward and recede from each other, respectively, and a rock-shaft having cranks with arms of different lengths, and devices for connecting the receiving-hopper with one set of said cranks and the weighing-hopper with the other set, and a suitable poise or weight and a counterpoise both mounted on the rock-shaft and adapted to swing to each side of the vertical.

In testimony whereof I affix my signature in presence of two witnesses.

HENRY C. BOWLUS.

Witnesses:
AL. H. KUNKER,
GERTRUDE D. YOUNG.